US006544037B2

(12) United States Patent
Fink

(10) Patent No.: US 6,544,037 B2
(45) Date of Patent: Apr. 8, 2003

(54) METHOD AND APPARATUS FOR TEACHING EXPERIENTIAL WRITING

(76) Inventor: Jeffrey A. Fink, 3340 Chelwood Dr., Concord, NC (US) 28027

( * ) Notice: Subject to any disclaimer, the term of this patent is extended or adjusted under 35 U.S.C. 154(b) by 0 days.

(21) Appl. No.: 09/836,504

(22) Filed: Apr. 17, 2001

(65) Prior Publication Data

US 2002/0150870 A1 Oct. 17, 2002

(51) Int. Cl.7 .............................................. G09B 11/00
(52) U.S. Cl. ...................................... 434/162; 434/167
(58) Field of Search ............................... 206/278, 578, 206/316.1, 31; 16/87 R; 283/95; 434/164, 167, 156, 130, 108, 162; 40/720, 701, 700; 428/195

(56) References Cited

U.S. PATENT DOCUMENTS

| | | | | |
|---|---|---|---|---|
| 3,734,543 A | * | 5/1973 | Donovan | 282/23 R |
| 3,751,839 A | * | 8/1973 | Mitchell | 40/536 |
| 3,980,323 A | * | 9/1976 | Boyreau | 283/57 |
| 4,938,414 A | * | 7/1990 | Lippert | 206/813 |
| 5,102,338 A | | 4/1992 | Kapiloff | |
| 5,230,627 A | | 7/1993 | Todd | |
| 5,306,155 A | | 4/1994 | Koke | |
| 5,427,413 A | | 6/1995 | Garza | |
| 5,435,240 A | | 7/1995 | Fromm | |
| 5,639,240 A | * | 6/1997 | Werzberger | 434/88 |
| 5,823,575 A | * | 10/1998 | Ives | 283/58 |
| 5,857,708 A | | 1/1999 | Harvey | |
| 5,944,351 A | * | 8/1999 | Koploy | 281/15.1 |
| 6,210,172 B1 | * | 4/2001 | Clements | 434/428 |
| 6,234,803 B1 | * | 5/2001 | Watkins | 273/299 |

OTHER PUBLICATIONS

Our Family History, Copyright 1981, Crown Publishers, Inc., 2000 Edition.*
An International Travel Map of Japan, copyright 1994/1997 Edition, Design and Cartography: Multi mapping Ltd.*

* cited by examiner

Primary Examiner—Derris H. Banks
(74) Attorney, Agent, or Firm—Dale J. Ream

(57) ABSTRACT

An apparatus for teaching and encouraging experiential writing by a child includes a picture pad having a plurality of sheets removably affixed to a foldable cover in the form of a checkbook. Each sheet includes a distinctive picture, its name, the first letter of its name, space for a user to write notes while actually viewing a place or thing depicted by the picture, and a line for a user's signature. Each sheet is individually and selectively removable from the picture pad. The apparatus includes a diary having a plurality of pages. Each page includes a first side capable of holding a sheet selectively removed from the picture pad and a second side having space for a user to write about actually viewing a place or thing depicted by a picture of a removed sheet.

11 Claims, 5 Drawing Sheets

20

DIRECTIONS
1. Check the box if you have experienced this activity.
2. Write the time and date of the activity.
3. Give more details about the activity. Tell what airport you went to.
4. Write personal notes about the activity.
5. Color the picture.
6. Sign your check.
7. Insert check into "Children's Diary".

METHOD AND APPARATUS FOR TEACHING EXPERIENTIAL WRITING

BACKGROUND OF THE INVENTION

This invention relates generally to educational development books and, more particularly, to an apparatus having a checkbook-style picture pad and diary for teaching and encouraging a child to write about common life experiences.

Fostering the desire and developing a child's ability to write effectively is a task that is not always successfully accomplished in an academic setting. In addition, practical life skills such as the responsibility of handling a checkbook are not typically introduced until a child's teenage years or beyond. Although various methods have been proposed for teaching creative and dialogue writing, these methods do not teach practical life skills while encouraging children to write about common life experiences.

Therefore, it is desirable to have a method and apparatus for teaching and encouraging experiential writing. Further, it is desirable to have a checkbook-style picture pad to encourage writing about viewing common places and things and following instructions to correctly fill out respective sheets. Finally, it is desirable to have an apparatus in which respective sheets representing places or things viewed by a child may be placed in a diary along with a more detailed description of the viewing experience.

SUMMARY OF THE INVENTION

A method and apparatus for teaching and encouraging experiential writing includes a checkbook-style picture pad having a cover constructed of flexible material that is folded into first and second portions along an axis extending longitudinally therebetween. A plurality of sheets are affixed to the cover along the axis with an adhesive coating connected to common longitudinal edges of the sheets. A top sheet includes instructions as to how to fill out subsequent sheets. Top sheet excluded, each sheet includes a picture imprinted thereon that is distinctively different from a picture imprinted on any other sheet. Each picture depicts a common object such as a car or bicycle, or a common place such as a supermarket or museum. Each sheet further includes the name commonly associated with the picture. Each sheet includes the first letter of the name positioned along the lower edge or corner and the sheets are arranged in alphabetical order based on those first letters. Each sheet includes a checkbox for indicating that a child has actually viewed the place or thing depicted in the picture and includes spaces for recording the location, date, and time of the viewing and for writing notes about the experience. A signature line is also included upon which a child may sign his name when all other information has been recorded, just as with a real checkbook.

The apparatus further includes a diary having a plurality of pages 49 affixed to a spine between front and back covers. Each page includes a front side capable of holding a sheet having been removed from the picture pad. Each page also includes a second side having space for writing in greater detail about the experience of viewing the place or thing depicted by a picture on a selected sheet. Therefore, a selected sheet may be removed from the picture pad after viewing the place or thing depicted in the respective picture and the sheet may be releasably coupled to the first side of a selected diary page. Then, a detailed description of the viewing experience may be written on the second side of an adjacent diary page facing the selected sheet. This method and apparatus is useful for encouraging children to be observant of their surroundings, to write about life experiences, and to follow instructions similar to those needed to accomplish life skills like managing a checkbook.

Therefore, a general object of this invention is to provide a method and apparatus for teaching and encouraging a child to write about life experiences within the framework of managing a checkbook.

Another object of this invention is to provide a method and apparatus, as aforesaid, having a checkbook-like picture pad having a plurality of sheets with each sheet having a picture of a common place or object.

Still another object of this invention is to provide a method and apparatus, as aforesaid, in which each sheet of the picture pad is arranged alphabetically so as to teach a child the alphabet and what letter each picture starts with.

Yet another object of this invention is to provide a method and apparatus, as aforesaid, having instructions for filling out the picture pad sheets and placing them in a diary.

A further object of this invention is to provide a method and apparatus, as aforesaid, in which each sheet includes a checkbox so that a child can check off a picture when it has actually been viewed.

A still further object of this invention is to provide a method and apparatus, as aforesaid, which teaches and encourages good observation and writing skills.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
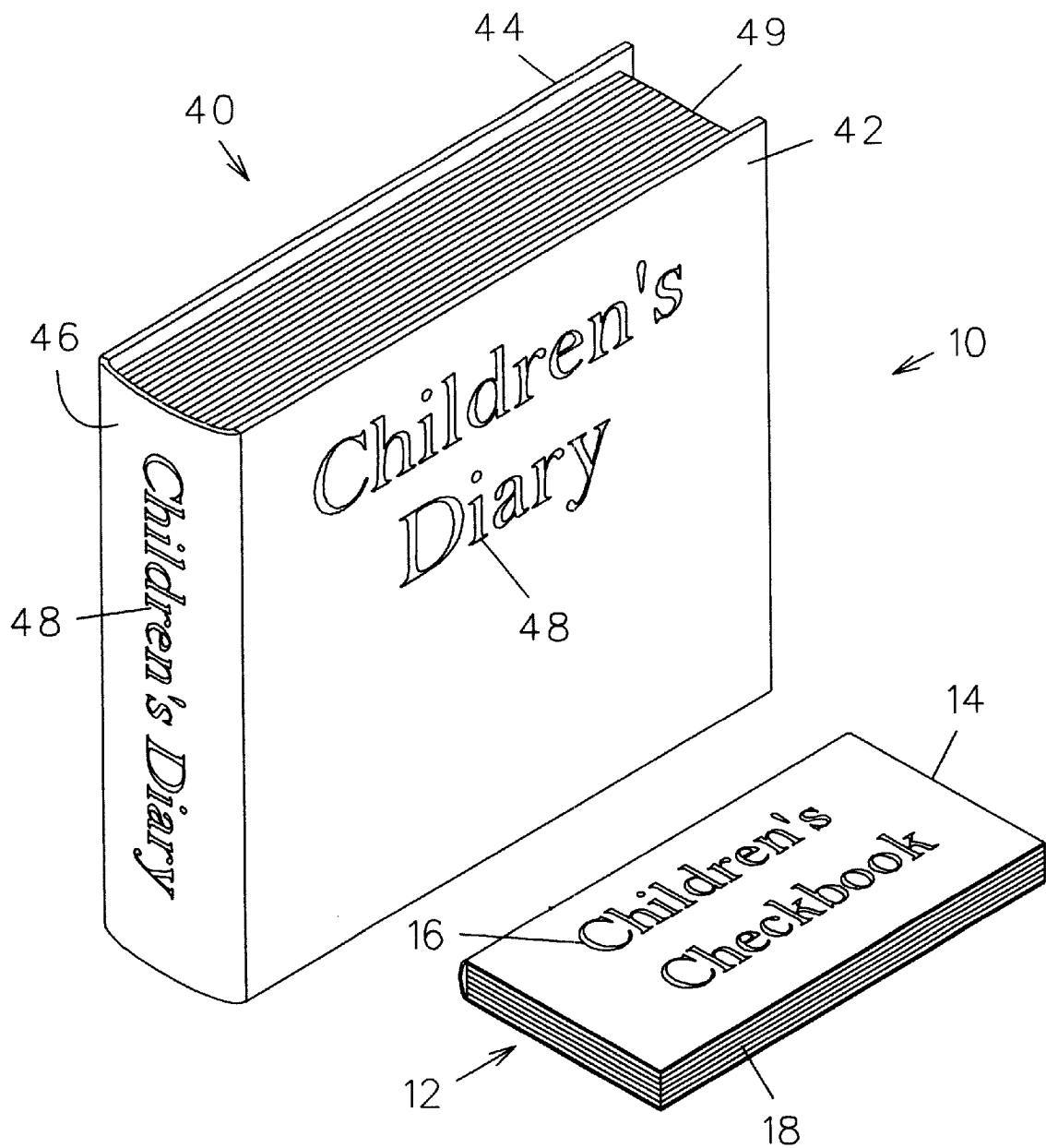
FIG. 1 is a perspective view of a picture pad and diary for teaching experiential writing according to a preferred embodiment of the present invention.
Figure 2:
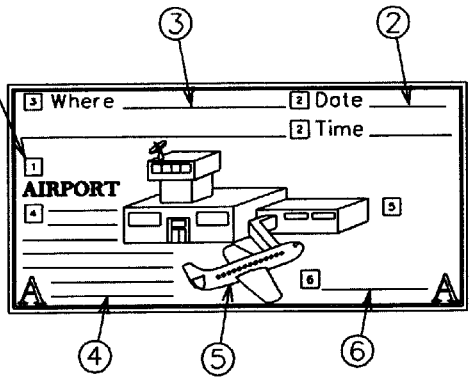
FIG. 2 is a front view of a top sheet of the picture pad as in FIG. 1.

A method and apparatus 10 for teaching and encouraging experiential writing by a child in the context of managing a checkbook according to a preferred embodiment of the present invention will now be described with reference to FIGS. 1–5 of the accompanying drawings. The apparatus 10 includes a picture pad 12 in the form of a checkbook and a diary 40 having a special configuration (FIG. 1). The picture pad 12 includes a conventional checkbook cover 14 constructed of a flexible material such as leather although a vinyl plastic construction would also be suitable. The cover 14 includes first and second portions that may be folded generally in half upon one another about an axis extending longitudinally between the two portions. The first portion (front) of the cover 14 may also include indicia identifying the picture pad 12 as a "Children's Checkbook" 16 (FIG. 1). The picture pad 12 includes a plurality of generally rectangular sheets 18, the first of which is a top sheet 20 (FIG. 2)

on which instructions are imprinted to instruct a child user as to how to fill out the sections of the remaining sheets (FIGS. 3 and 4), as to be described more fully below. The plurality of sheets 18 are attached to the cover 14 along the axis with an adhesive coating on common longitudinal edges of the sheets. It is understood, however, that perforated sheets would also be suitable. Thus, each sheet 18 is selectively and individually removable from the picture pad 12.

Figure 3:
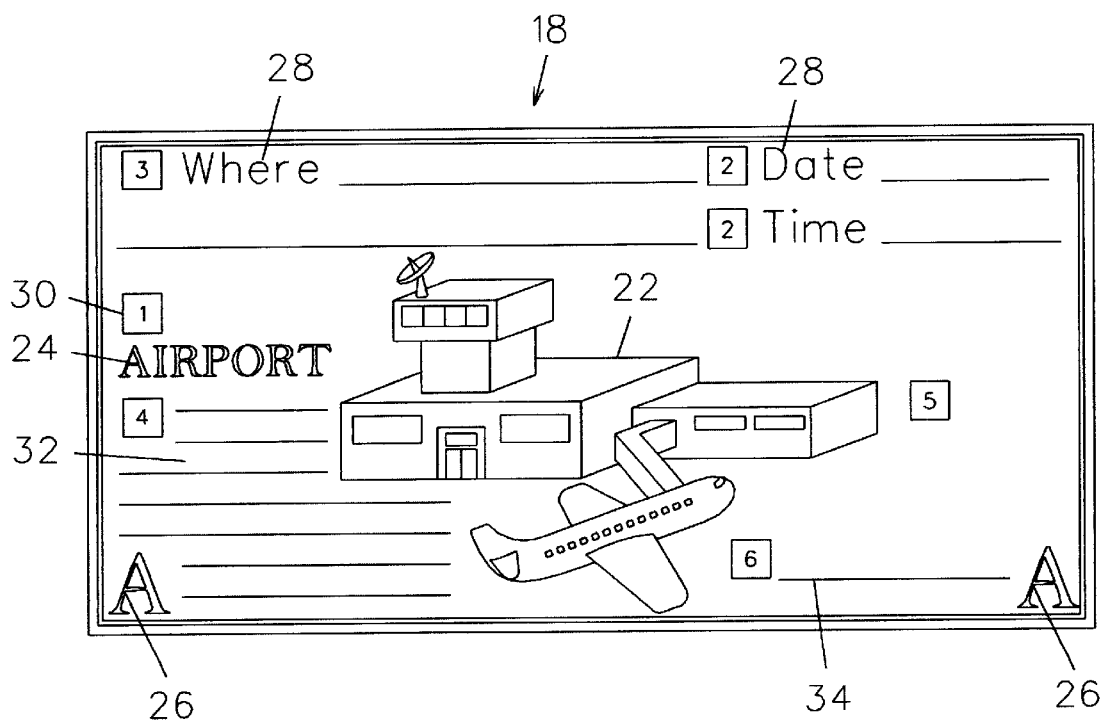
FIG. 3 is a front view of another sheet of the picture pad as in FIG. 1.
Figure 4:
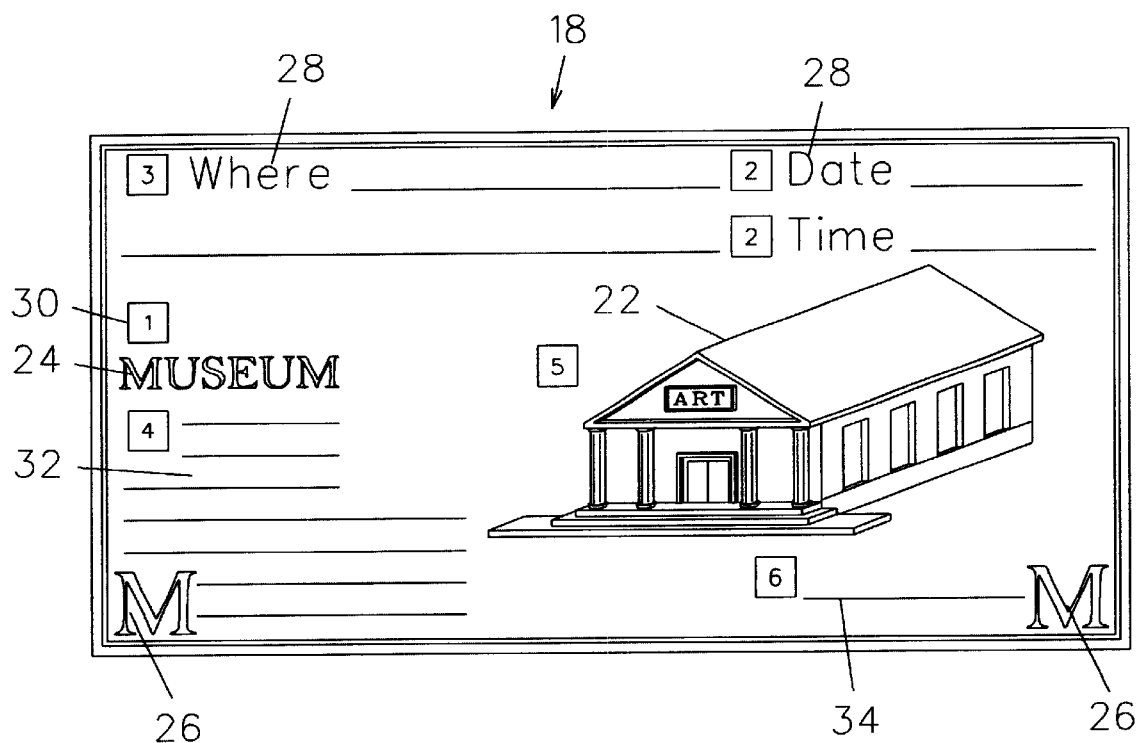
FIG. 4 is a front view of yet another sheet of the picture pad as in FIG. 1.

Except for the top sheet 20 (FIG. 2), each sheet 18 includes a distinctive picture 22 imprinted thereon which depicts a common place, object, or thing, such as an airport, museum, bicycle, car, rainbow, or the like (FIGS. 3 and 4). In other words, each picture 22 is different from a picture on any other sheet within the picture pad 12. Each sheet 18 further includes a first indicia 24 imprinted thereon and positioned adjacent to a respective picture 22 which is indicative of the common name associated with the picture, such as "airport" or "museum", etc. A second indicia 26 imprinted on each sheet such as "airport" or "museum", etc. A second indicia 26 imprinted on each sheet includes only the first letter of the first indicia (name) and is positioned in at least one of the lower corners of a respective sheet although it may be placed in both corners or along the lower edge. Preferably, the picture pad 12 includes only one sheet 18 having a picture whose name starts with each letter of the alphabet so that the sheets may be arranged alphabetically. This arrangement allows a child to locate a desired sheet more quickly and facilitates learning of the alphabet and the concept of alphabetical order.

Each sheet 18 includes third indicia 28 positioned adjacent a top edge and having the words "where", "date", and "time", followed by space prompting a child to write appropriate details regarding an actual viewing event (FIGS. 3 and 4). Of course, the top sheet 20 includes specific instructions as to filling in these sections. Each sheet 18 further includes a checkbox 30 imprinted thereon and positioned adjacent a respective picture 22 and above the first indicia (name) 24 in which a child may inscribe a checkmark to indicate that the place or thing depicted by the respective picture 22 has actually been viewed. Each sheet 18 further includes space 32 between the first 24 and second 26 indicia for writing notes while actually viewing the place or object depicted by a respective picture, these notes being for future reference when writing in the diary 40, as to be described more fully below. Preferably, this space includes a plurality of lines although a blank space would also work. A signature line 34 is also imprinted on each sheet 18 adjacent a lower edge thereof on which a user is instructed to sign his name. It is understood that a child would check the checkbox 30 and sign the sheet 18 after actually viewing the object of the picture 22.

Figure 5:
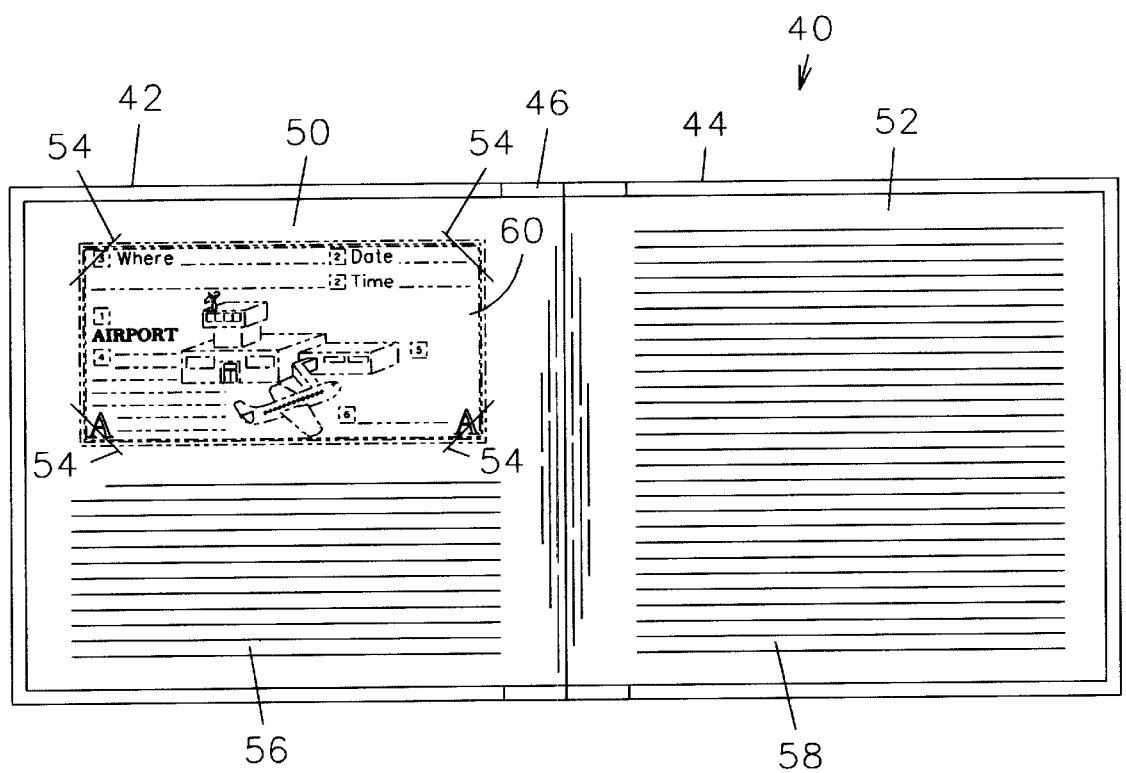
FIG. 5 is a front view of the diary as in FIG. 1 in an open configuration.

The diary 40 includes generally rectangular front 42 and back 44 covers with a spine 46 connecting common edges of the front 42 and back 44 covers. The front cover 42 and spine 46 may include indicia identifying the diary as "Children's Diary" 48 (FIG. 1). This indicia adds to the association between the diary 40 and picture pad 12. The diary 40 includes a plurality of pages, each page having first 50 and second 52 sides (FIG. 5). Each first side 50 includes means for releasably holding a sheet 60 selectively removed from the picture pad 12. Preferably, the holding means is a conventional spaced apart arrangement of four angularly oriented slits 54 into which corners of a sheet 18 may be inserted. Alternately, the holding means may include a plurality of paper hinges (not shown) adhesively coupled to each first side 50 and which operate to hold corners of a selectively removed picture pad sheet 60 in a manner substantially similar to that in which photographs are often held in a photo album or scrapbook. The first side 50 also includes lined space 56 for a user to write about the experience of viewing the place or thing depicted by the picture 22 on the selectively removed sheet 60. This may be an elaboration on the notes taken while actually viewing the place or thing. The second side 52 of each page includes additional space 58 for writing about a viewing experience.

In use, the checkbook-style picture pad 12 and diary 40 are included together as the apparatus 10 and method of teaching and encouraging a child to write about his experience of viewing common objects and places in the context of managing a checkbook. Following the instructions imprinted on the top sheet 20, a child is encouraged to locate an appropriate sheet 60 in the picture pad 12 when a place or thing depicted by a respective picture 22 is actually viewed. The child is then able to color the picture, place a checkmark in the checkbox 30, record details about the event, write notes for future reference, and sign the sheet 60. The respective sheet 60 may then be selectively removed from the picture pad 12 and removably coupled to a selected first side 50 of a diary page. The user may then write a more detailed account of the experience of viewing the place or thing depicted by the picture on the selectively removed sheet 60. This elaborated account may be continued on a second side 52 of a page facing the selectively removed sheet 60. Therefore, this method and apparatus 10 teaches a child to follow specific instructions relative to filling out a check-like sheet and encourage the child to write about common life experiences.

It is understood that while certain forms of this invention have been illustrated and described, it is not limited thereto except insofar as such limitations are included in the following claims and allowable functional equivalents thereof.

Having thus described the invention, what is claimed as new and desired to be secured by letters patent is as follows:

1. An apparatus for teaching and encouraging experiential writing by a child from the context of managing a checkbook, comprising:

a picture pad including a generally rectangular cover of flexible material having first and second portions foldable generally in half about an axis extending longitudinally between said first and second portions, said picture pad including a plurality of sheets affixed to said cover along said axis and capable of being individually selectively removed from said cover, each sheet comprising:

a picture imprinted thereon distinctively different from a picture imprinted on any other sheet and depicting a place or thing;

a first indicia imprinted thereon positioned adjacent said picture and indicative of a name of said picture;

a second indicia imprinted thereon and positioned in a lower corner of said sheet, said second indicia including a first letter of said first indicia for alphabetically arranging said plurality of sheets according to said second indicia;

a box imprinted thereon above said first indicia for a user to inscribe a checkmark therein after having actually viewed the place or thing depicted by said picture;

space below said first indicia for a user to write notes for future reference while viewing the place or thing depicted by said picture;

a signature line imprinted on said sheet adjacent said space for a user to write a signature in the manner of signing a check;

a diary separate from said picture pad, said diary including:
- a cover having a generally rectangular front and a generally rectangular back with a spine connecting side edges of said front and back; and
- a plurality of pages affixed to said spine and positioned between said front and back, each page having first and second sides, wherein a respective first side includes means for releasably holding a sheet selectively removed from said picture pad and wherein a second side facing said respective first side includes space for writing said future reference notes of said selectively removed sheet in an elaborated form.

2. The apparatus as in claim 1 further comprising third indicia imprinted on said sheet for prompting a user to write a location, date, and time relative to actually viewing the place or thing depicted by said picture.

3. The apparatus as in claim 1 wherein said plurality of sheets includes a top sheet having instructions imprinted thereon relative to a user writing on subsequent sheets.

4. The apparatus as in claim 1 wherein said plurality of sheets are affixed to said cover with a layer of adhesive on common longitudinal edges of said plurality of sheets.

5. An apparatus for teaching and encouraging experiential writing by a child from the context of managing a checkbook, comprising:
- a picture checkbook having a generally rectangular cover of flexible material having first and second portions foldable in half about an axis extending longitudinally between said first and second portions;
- a plurality of sheets affixed to said cover along said axis with an adhesive coating on common longitudinal edges of said plurality of sheets, each sheet being individually and selectively removable from said cover and having a distinctive picture imprinted thereon depicting a place or thing;
- a diary separate from said picture checkbook having a generally rectangular front cover and a generally rectangular back cover with a spine connecting corresponding side edges of said front and back covers; and
- a plurality of pages affixed to said spine and positioned between said front and back covers, each page having a first side and a second side, wherein a respective first side is capable of releasably holding a sheet selectively removed from said picture checkbook and a second side facing said respective first side includes space for writing a description of a users experience actual viewing the place or thing depicted by a respective picture imprinted upon said selectively removed sheet;
- a first indicia imprinted thereon and positioned adjacent said picture, said first indicia indicative of a name of said picture;
- a second indicia imprinted thereon and positioned in at least one lower corner of said sheet, said second indicia including a first letter of said first indicia, said second indicia enabling a user to efficiently locate a desired sheet;

wherein each sheet comprises:
- space below said first indicia for a user to write notes for future reference while viewing the place or thing depicted by said picture;
- a signature line imprinted on said sheet adjacent said space for a user to write a signature in the manner of signing a check;
- a third indicia imprinted on said sheet for prompting a user to write a location, data, and time of actually viewing the place or thing depicted by said picture;
- a box imprinted thereon adjacent said picture for a user to inscribe a checkmark therein after having actually viewed the place or thing depicted by said picture.

6. The apparatus as in claim 5 further comprising a top sheet having instruction imprinted thereon relative to a user writing on subsequent sheets.

7. The apparatus as in claim 5 wherein said first side of each page of said diary defines a plurality of spaced apart slits for selectively receiving corners of said selectively removed sheet therein.

8. The apparatus as in claim 5 wherein said description of a user's experience actually viewing the place or thing depicted in said picture includes an elaboration upon said notes written for future reference.

9. A method for teaching a child to write about life experiences within the context of managing a checkbook, comprising:
- providing a picture pad having a generally rectangular cover of flexible material, said cover having first and second portions foldable in half about an axis extending longitudinally between said first and second portions, said picture pad including a plurality of sheets affixed to said cover along said axis, each sheet being individually and selectively removable from said cover and having a distinctive picture imprinted thereon depicting a place or thing, wherein said picture pad is in the form of a checkbook with each sheet including:
  - a first indicia imprinted thereon positioned adjacent said picture and indicative of a name of said picture;
  - a second indicia imprinted thereon and positioned in a lower corner of said sheet, said second indicia including a first letter of said first indicia, whereby said plurality of sheets are arranged alphabetically according to said second indicia such that a respective sheet may be quickly identified and located;
  - a checkbox imprinted thereon and positioned above said first indicia;
  - a third indicia imprinted thereon for prompting a user to write a location, date, and time relative to actually viewing the place or thing depicted by said picture;
- removing a respective sheet from said cover after having actually viewed the place or thing depicted in said picture on said respective sheet;
- providing a diary having a front cover and a back cover with a spine connecting said front and back covers, said diary including a plurality of pages affixed to said spine and positioned between said front and back covers, each page having a first side capable of releasably holding a sheet removed from said picture pad and a second side having space for a user to write thereon;
- releasably coupling said respective sheet removed from said picture pad to a respective first side of a selected diary page;
- writing on a respective second side of another diary page facing said selected diary page regarding a user's experience actually viewing the place or thing depicted by a picture imprinted upon said respective sheet; and
- inscribing a checkmark in said checkbox after actually viewing the place or thing depicted in said picture imprinted on said sheet.

10. The method as in claim 9 further comprising writing notes on a respective sheet for future reference regarding a user's experience of actually viewing the place or thing depicted by a picture imprinted on said respective sheet.

11. The method as in claim 9 further comprising writing a location, date, and time on a respective sheet after having actually viewed the place or thing depicted by a picture imprinted on said respective sheet.

* * * * *